Figure 3:
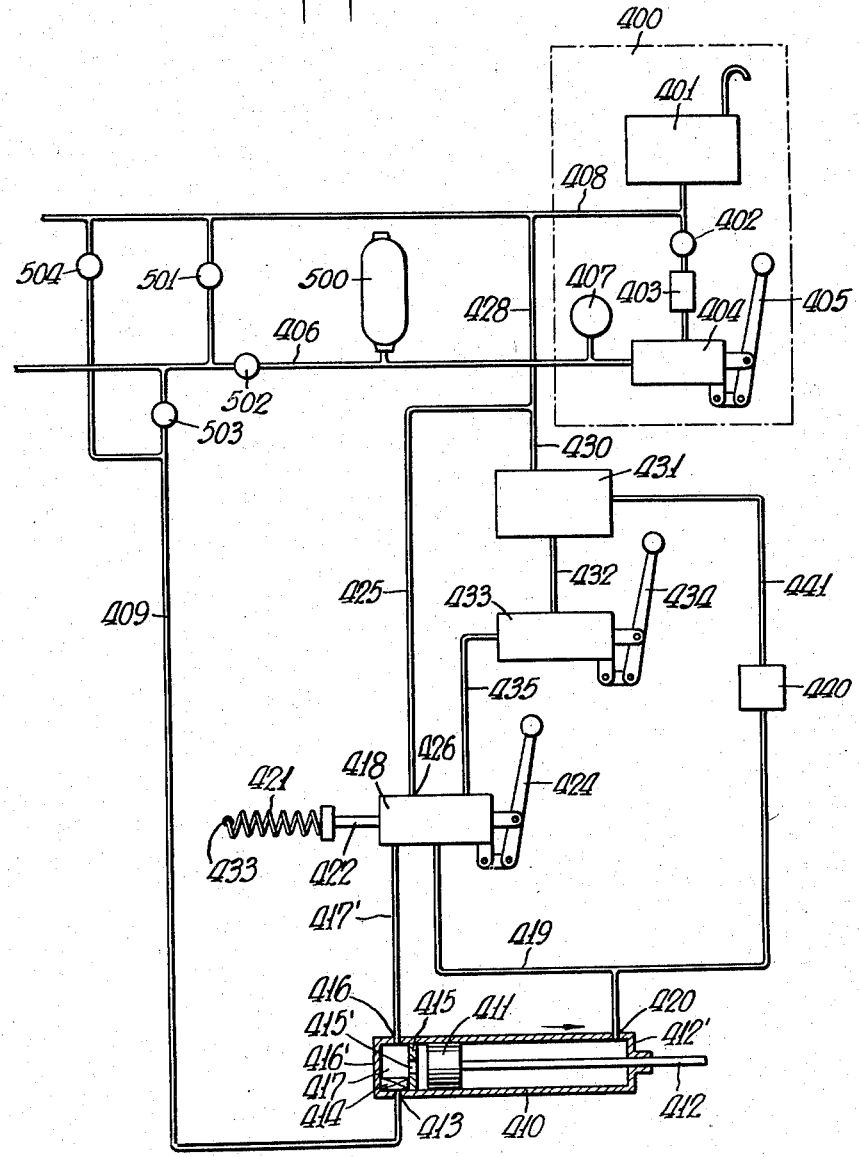

Feb. 24, 1959 J. MERCIER 2,874,958
CONTROL SYSTEMS FOR PARTITIONS OR THE LIKE
Original Filed Sept. 6, 1951 5 Sheets-Sheet 1
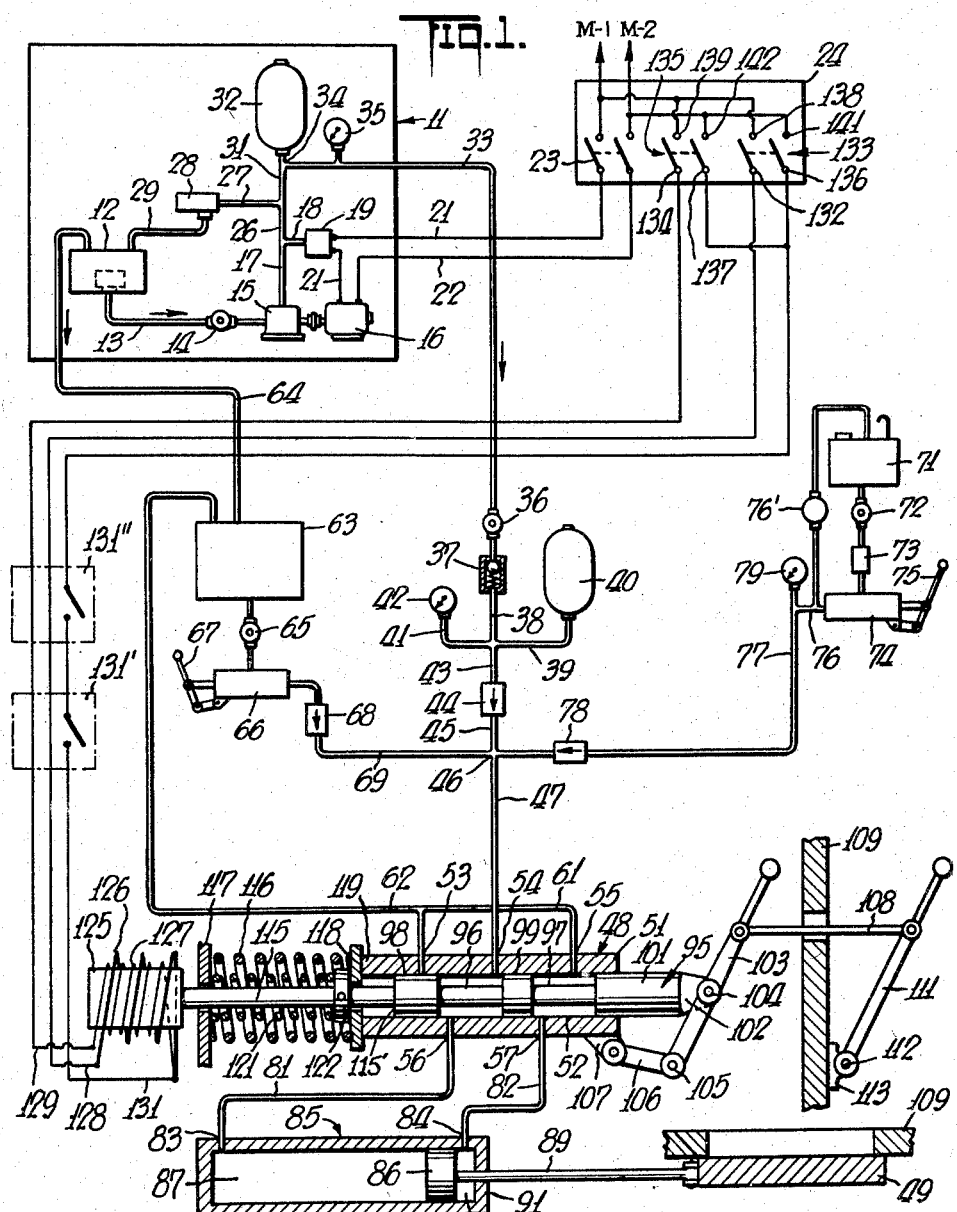
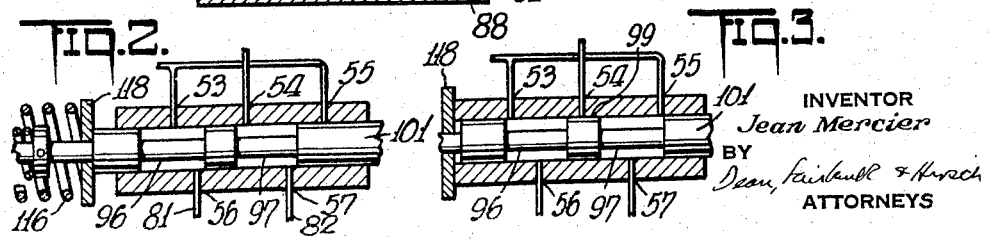
INVENTOR
Jean Mercier
BY
Dean, Fairbank & Hirsch
ATTORNEYS

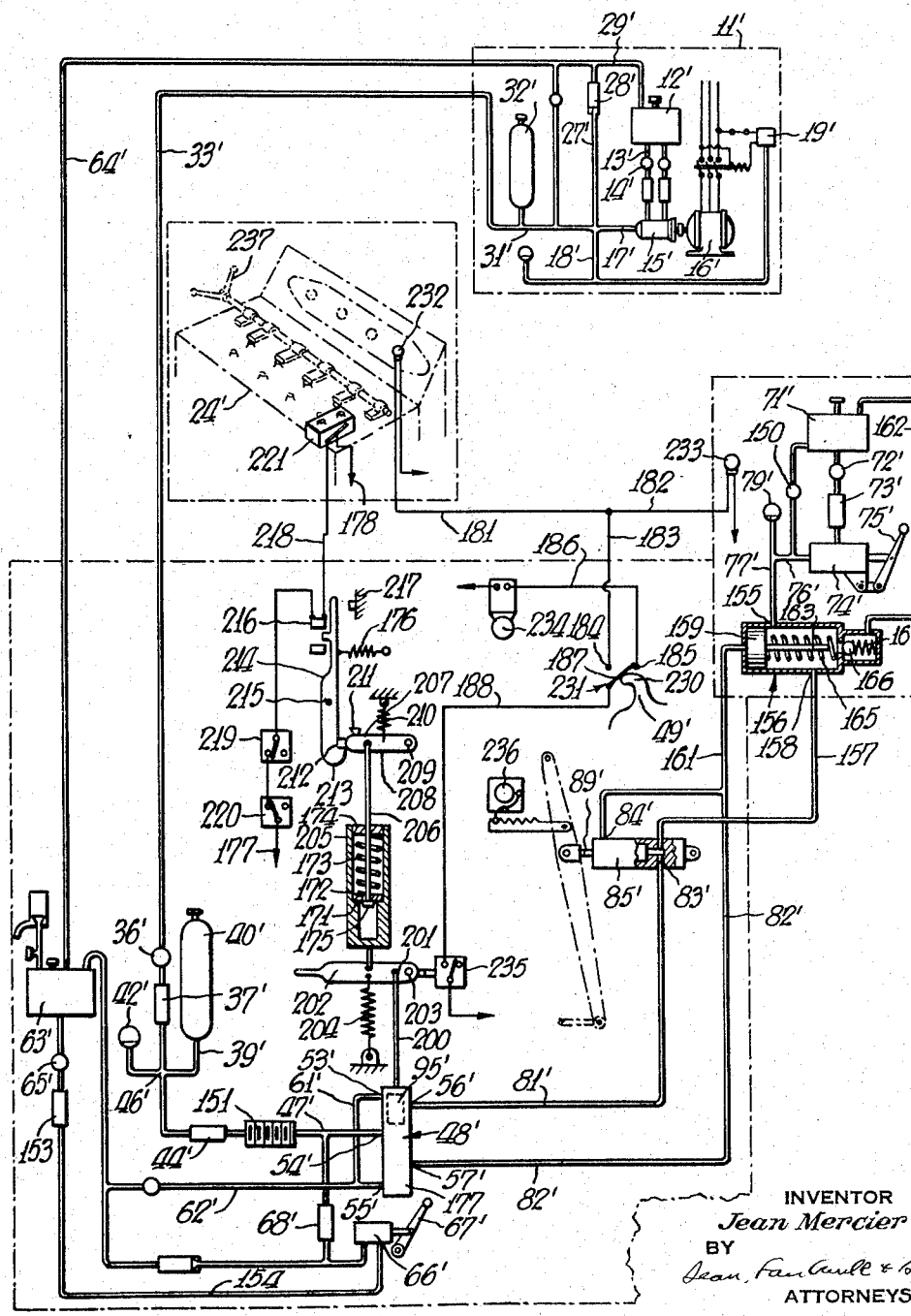

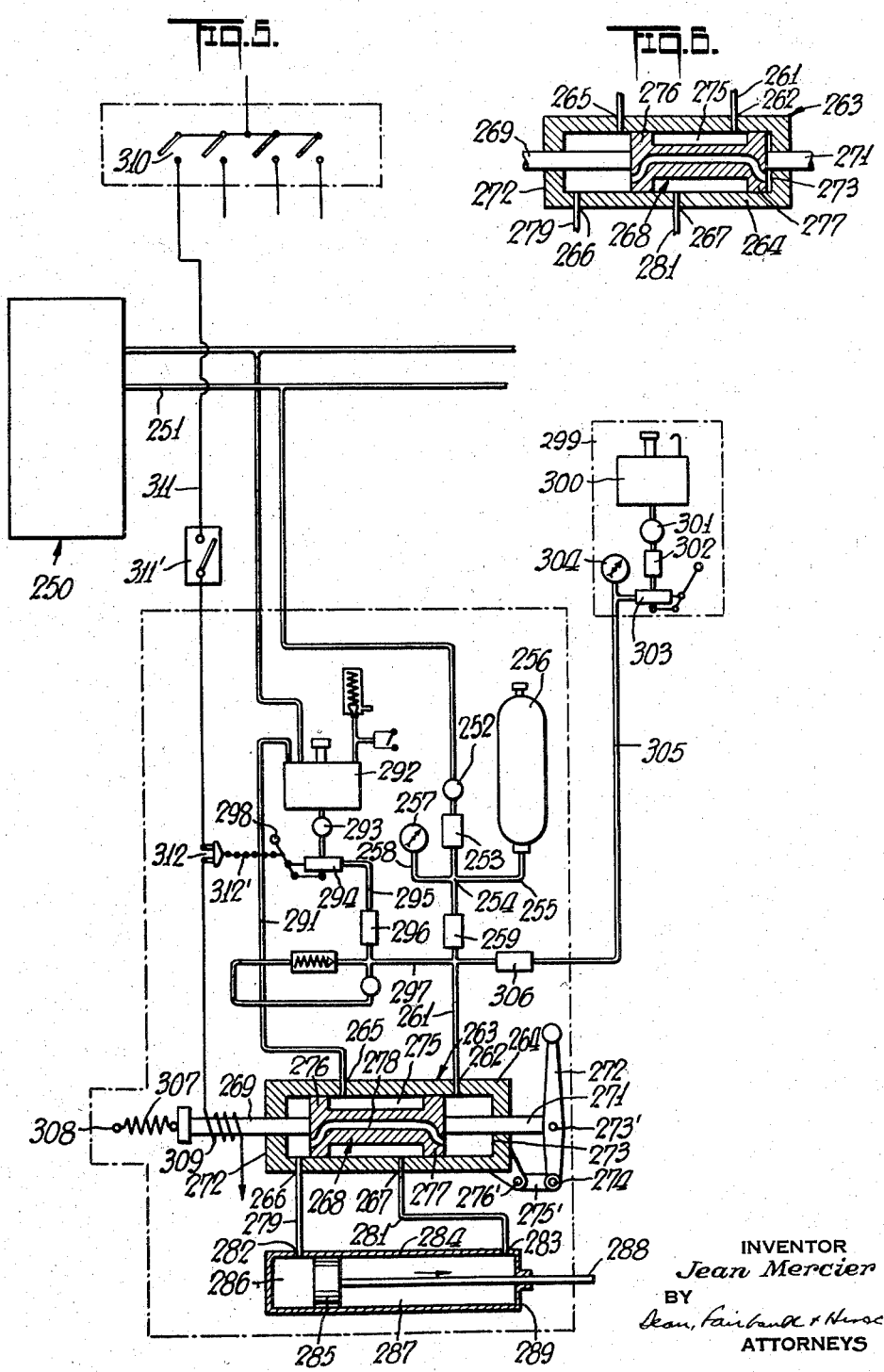

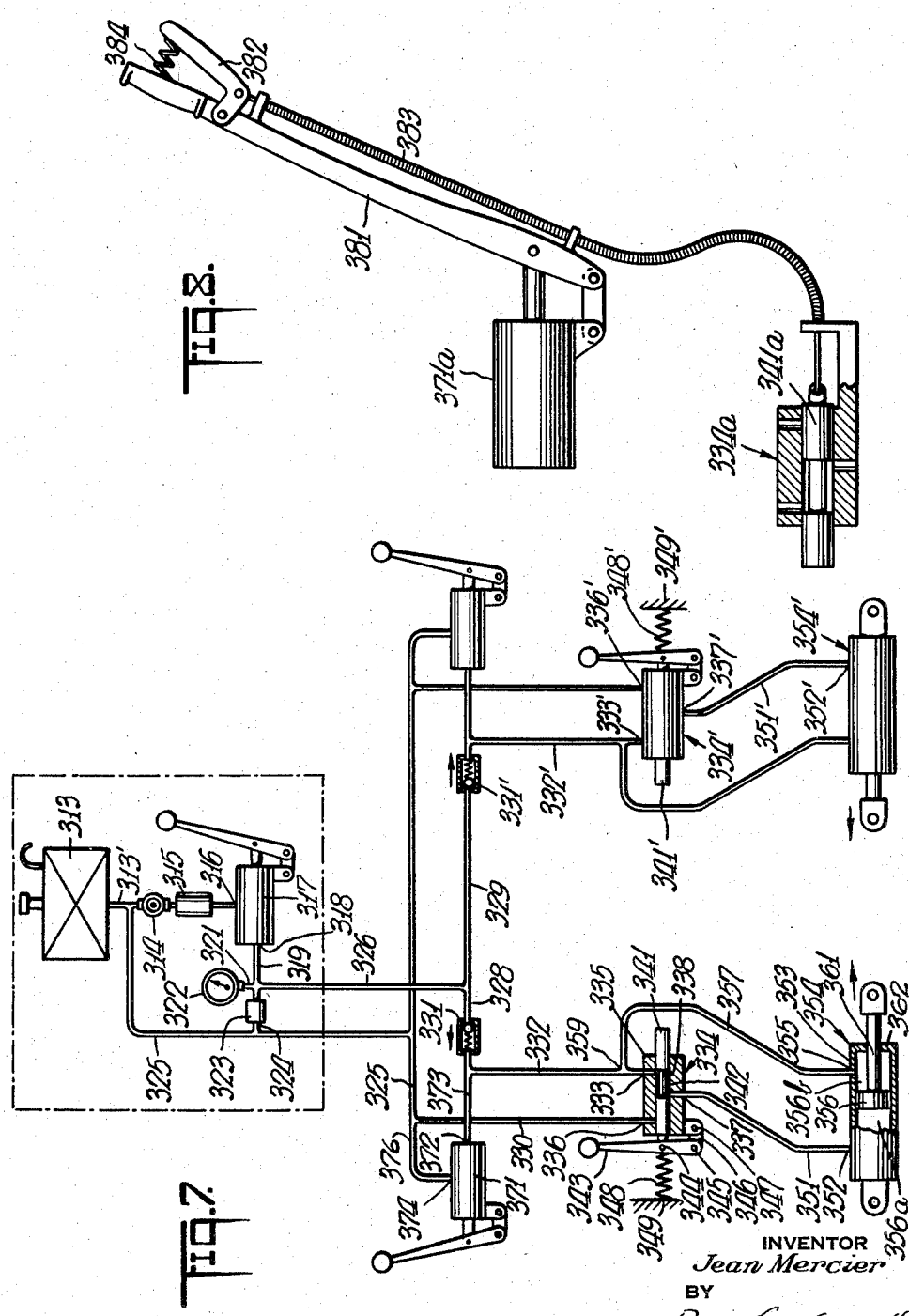

United States Patent Office 2,874,958
Patented Feb. 24, 1959

2,874,958

CONTROL SYSTEMS FOR PARTITIONS OR THE LIKE

Jean Mercier, New York, N. Y.

Original application September 6, 1951, Serial No. 245,367, now Patent No. 2,741,478, dated April 10, 1956. Divided and this application April 3, 1956, Serial No. 582,309

12 Claims. (Cl. 268—50)

This invention relates to control systems for partitions and more particularly for the bulkhead doors of a ship or the sluice gates of a reservoir or irrigation system.

It is among the objects of the invention to provide a control system of the above type which has but few parts, none of which are likely to become out of order, and which may be operated both from a remote position and from a local position adjacent the partition or sluice gate to open or close the partition or sluice gate and which may be opened or closed at the local position without possibility of the operator at the remote position interfering with the action at the local position.

Another object is to provide a system of the above type that may readily be controlled both from a remote position and from a local position adjacent the partition or sluice gate, automatically and dependably to operate the latter to effect opening and closing thereof, and which may also, in the event of breakdown of the automatic features of the system, be manually operated from the local position to effect such opening and closing.

According to the invention the control system includes a central power unit having a fluid reservoir which, through a main feed line, is connected to the bulkhead door to be operated, each door having a hydraulic cylinder for actuation thereof and a selector valve associated with said cylinder, said selector valve being movable between at least opening position and closing position of the door and desirably being normally urged toward one of such positions.

In the case of bulkhead doors on ships, it is the closing position of the door which is desired for water-tight security of the ship and the selector valve is normally urged to this position. In other applications, for instance in irrigation networks where opening of the door, which may be a sluice gate or the like, permits overflow of the water channels or pipes, the door opening position is desirable.

This application is a division of copending application Serial No. 245,367, filed September 6, 1951, now Patent No. 2,741,478, dated April 10, 1956.

The system may be designed so that either the local position adjacent the door or the remote position at the central power unit is to control, and in such case the position that is not a control is rendered ineffective.

In the accompanying drawings in which are shown one or more of various possible embodiments of the several features of the invention, Fig. 1 is a diagrammatic view of one embodiment of the system, with the selector valve in partition closing position, Fig. 2 is a detail sectional view of the selector valve in partition opening position, Fig. 3 is a view similar to Fig. 2 of the selector valve in neutral position, Fig. 4 is a diagrammatic view of another embodiment of the invention, Fig. 5 is a view similar to Fig. 4 of still another embodiment of the invention with the selector valve in partition closing position, Fig. 6 is a detail view of the selector valve of Fig. 5 in partition opening position, Fig. 7 is a diagrammatic view of still another embodiment of the invention particularly intended to control a small number of partitions, Fig. 8 is a view showing a modification of the local control mechanism of Fig. 7, and Fig. 9 is a modification of the embodiment shown in Fig. 7.

Referring now to Fig. 1 of the drawings, the system which is illustratively shown as applied to the bulkhead door of a ship, desirably comprises a central power unit 11 which may be located in any suitable place such as, for example, in the hold of a ship, and includes a liquid reservoir 12 connected by line 13 through valve 14 to a compressor pump 15 driven by a motor 16. The output of the pump 15 is connected by lines 17 and 18 to a safety pressure switch 19 electrically connected in series with one of the leads 21 to the motor 16, lead 21 and the other lead 22 of the motor being connected to a source of potential M-1 and M-2 through a double pole single throw switch 23 mounted on switch panel 24 which is desirably located on the bridge of the ship.

The output of pump 15 is connected by lines 17, 26 and 27 to a pressure relief valve 28 connected by line 29 to the reservoir 12. The output of pump 15 is also connected by lines 17, 26 and 31 to a pressure accumulator 32, which may be of any suitable type. The output of the central power unit is desirably supplied to the system to be operated through a main feed line 33, the latter being connected to the accumulator 32 as at 34 and having a pressure gauge 35 connected thereto.

The main feed line 33 is desirably connected to a shut-off valve 36 and thence through a one-way valve 37 and lines 38 and 39 to a pressure accumulator 40 which also may be of a conventional type and which takes up any surges or shock waves in the line and which provides a secondary supply of fluid in the manner hereinafter described. Line 38 is also connected by line 41 to a pressure gauge 42 and by line 43 to a one-way valve 44, the output of which is connected by line 45 to a junction 46 and from such junction through line 47 to a selector valve 48 desirably located adjacent the bulkhead door 49 to be operated.

The selector valve 48 is preferably of the three-position type having a door closing, a door opening, and a neutral position, and is illustratively shown in the door closing position. The selector valve desirably comprises a substantially cylindrical outer casing 51 having a plurality of ports therein leading into the bore 52 thereof and referred to by the numerals 53, 54, 55, 56 and 57, the port 54 which is the liquid inlet port desirably having the line 47 connected thereto.

Desirably the ports 53 and 55 of the selector valve which are the liquid outlet ports, are connected together by line 61 which is connected by liquid return line 62 to the auxiliary reservoir 63, the latter being connected by liquid return line 64 to the main reservoir 12 in the central power unit. The reservoir 63 is connected through cut-off valve 65 to a manually operated pump 66 having a pump handle 67 for operation thereof, the output of said pump being connected through one-way valve 68 and line 69 to junction 46, said pump 66 being located adjacent the selector valve 48 and the bulkhead door 49 to be operated, the lever handle 67 of the pump desirably being accessible on both sides of the door 49, through suitable linkage (not shown).

An auxiliary station is also provided which may be located at some intermediate position between the bridge of the ship and the bulkhead door to be operated. Such auxiliary station may comprise a reservoir 71 connected through cut-off valve 72 and one-way valve 73 to a pump 74, which also has an operating handle 75, the pump being connected through lines 76 and 77 and one-way valve 78 to junction 46, a pressure gauge 79 desirably being provided adjacent pump 74 to indicate the pressure in the system when the handle 75 of pump 74 is operated. Desirably a return line having a safety valve 76' is provided from pump 74 to reservoir 71 to prevent the development of excessive pressures in the pump 74.

The discharge ports 56 and 57 of the selector valve 48 are desirably connected by lines 81 and 82 to the ports 83 and 84 of a hydraulic cylinder 85. This cylinder desirably has a piston 86 therein defining chambers 87 and 88 on each side thereof with which ports 83 and 84 respectively communicate. The piston desirably has a piston rod 89 connected thereto which extends through the end wall 91 of the cylinder and is connected to the sliding bulkhead door 49.

The ports of the selector valve are desirably controlled by a valve member 95 slidably mounted in the bore 52 of casing 51 and desirably comprising a cylindrical rod having two annular grooves 96 and 97 therein which also define port closing portions 98, 99 and 101 in the valve member. In order manually to actuate the valve member so that it may be moved to either door opening, door closing or neutral position, the end 102 of the valve member which protrudes from the casing 51 desirably has a control handle 103 pivotally connected thereto as at 104 with the lower end of the control handle 103 being pivotally connected as at 105 to a link 106 pivotally connected to a lug 107 integral with the casing 51.

Desirably the selector valve may be controlled from both sides of the bulkhead door 49 and to this end the control handle 103 desirably has a link 108 pivotally connected thereto at one end and extending through an opening in the wall 109 adjacent the door 49, the other end of the link being pivotally connected to a control handle 111 pivotally mounted at its lower end at as 112 to a bearing 113 affixed to wall 109.

Means are desirably provided normally to retain the selector valve in door closing position with the liquid inlet port 54 in communication with port 56 through annular groove 96 and with ports 55 and 57 in communication through annular groove 97. For this purpose the valve member 95 has a reduced axial portion 115 defining a shoulder 115' and extends longitudinally beyond the other end of casing 51. A coil spring 116 encompasses axial extension 115 and is compressed between a retaining wall 117 and a washer 118 idly mounted on reduced portion 115 and urged against end 119 of the casing. Desirably a second coil spring 121 which is weaker than coil spring 116 and is encompassed thereby, also encompasses reduced portion 115 and is compressed between wall 117 and a collar or stop 122 affixed to reduced portion 115 and spaced from shoulder 115', the spring 121 normally urging the valve member to door closing position, as shown in Fig. 1.

Means are desirably provided to move the valve member 95 to door opening position and to neutral position as desired, against the action of springs 116 and 121 from the bridge of the ship. To this end the reduced portion 115 extends through retaining wall 117 and is of enlarged diameter at its end to define an armature 125. Encompassing said armature so as to form a solenoid are desirably two coils 126 and 127, the former being of greater power than the latter, said coils having leads 128 and 129, respectively, and a common lead 131. Lead 128 is connected to movable switch arm 132 of double pole single throw switch 133 on switch panel 24. Lead 129 is connected to movable switch arm 134 of double pole single throw switch 135 on switch panel 24 and common lead 131 is connected through two series connected single pole single throw switches 131' and 131", located respectively on each side of the bulkhead door, to movable switch arms 136 and 137 of switches 133 and 134, respectively. The fixed contacts 138 and 139 associated with switch arms 132 and 134 are connected to main M-1 and the fixed contacts 141 and 142 associated with switches 136 and 137 are connected to main M-2.

It is of course to be understood that but a single spring could be used to control the armature 125 and a single coil associated therewith could be controlled by a rheostat or potentiometer so that the armature could be moved to either door opening or neutral position as desired.

With the construction above described, utilizing the coils 116 and 121, when the main power switch 23 on switch panel 24 is closed, the motor 16 will operate compressor pump 15 to charge the pressure accumulator 32. In addition, the pressure accumulator 40 will also be charged through line 33, valve 36 and one-way valve 37. With switches 133 and 135 in open position, the solenoid coils 126 and 127 are not energized and the springs 116 and 121 will force the slidable valve member to the position shown in Fig. 1 to retain the selector valve in door closing position. As a result, liquid will flow from the pressure accumulator 32 in the central power unit 11 through line 33, valve 36, one-way valve 37, line 43, one-way valve 44 through the junction 46, line 47, inlet port 54, annular groove 96, port 56, line 81 into port 83 and chamber 87 of the hydraulic cylinder. As a result the piston 86 thereof will be moved to the right to close the door and the liquid in chamber 88 will be forced through port 84, line 82, port 57 of selector valve 48, annular groove 97, port 55, lines 61 and 62 into reservoir 63 and thence through line 64 into reservoir 12 in the central power unit 11. As a result, liquid will flow continuously through the system and the door will be retained in closed position.

Once the bulkhead door 49 is closed, there is no need for further operation of motor 16 and continued flow of liquid through the hydraulic cylinder 85. The operator on the bridge need merely close switch 135 to energize coil 127 (assuming switches 131' and 131" are closed). As a result, the armature 125 and the valve member 95 will be moved to the left from the position shown in Fig. 1. Although the coil 127 is of sufficient strength to move the armature sufficiently so that collar 122 will compress coil spring 121, it is not of sufficient strength to compress the coil spring 116. As a result, when shoulder 115' engages washer 118, which is restrained by spring 116, no further movement will be imparted to the valve member.

The movement imparted to the valve member 95 by coil 127 will position the valve member in neutral position, as shown in Fig. 3, in which the liquid port 54 is sealed by closure portion 99 of the valve member and ports 53 and 55 are in communication with ports 56 and 57 through annular grooves 96 and 97, respectively.

With the valve member in neutral position, no further liquid can flow into port 54 and hence the pressure in lines 33 and accumulator 32, caused by the operation of the compressor pump 15 will build up to a value sufficient to actuate pressure switch 19 to cut off the circuit to the motor 16, and as long as the pressure in the accumulator 32 remains at this value, switch 19 will retain motor 16 cut off.

Where it is desired automatically to open the bulkhead door 49 from the bridge, it is merely necessary to close switch 133 to complete a circuit to coil 126. As a result, sufficient power will be applied to armature 95 to move the latter to the left against the tension of coil spring 116 to door opening position shown in Fig. 2, so that the liquid inlet opening 54 is in communication with port 57, through annular groove 97 and port 53 is in communication with port 56, through annular groove 96, the port 55 being closed by portion 101.

In this position liquid will be forced through line 82 into the chamber 88 in the hydraulic cylinder 85 to move the piston 86 thereof to the left to effect opening of the door, the liquid in chamber 87 being forced by the movement of piston 86, through line 81, ports 56 and 53 in the selector valve 48 and line 62 into reservoir 63 to be returned through line 64 to main reservoir 12.

If the bulkhead door has been opened from the bridge as above described, and a crew member in the neighborhood of the door should believe it best that the door be closed, he may readily effect such closure by merely opening switches 131' or 131", depending upon which side of the door he is positioned. Opening of switches 131' or 131" will deenergize coils 126 and 127 and the springs 116, 121 will move the selector valve to door closing position as previously described. Similarly, the bulkhead door may be closed by a switch (not shown) in series with lead 131 and located at the auxiliary station.

In any event under usual conditions, the bulkhead doors are normally closed for water-tight security of the ship, and controlled by the crew member adjacent the door rather than from the bridge and the switches 133 and 135 on the bridge are normally open so that the doors will be closed.

When a member of the ship's crew desires to move from one section of the ship to another, he must open the bulkhead door 49 which is normally closed. This is readily accomplished by moving the handle 103 on one side of the door 49 to door opening position to slide the valve member 95 against the tension of coil springs 116 and 121. As a result, the valve member will be moved to the position shown in Fig. 2 so that liquid may flow as previously described, through the liquid port 54 to chamber 88 of the hydraulic cylinder 85 to open the door.

In order to retain the door open so that he may pass through, the crew member would hold the handle 103 in door opening position and as he steps through the open door also grasp the handle 111 on the other side of the wall 109, which is also in door opening position. After the crew member is through the door, he may release the handle 111 and the valve member 95 will automatically be moved by the springs 116 and 121 to door closing position shown in Fig. 1 so that the door will close automatically due to the pressure in the hydraulic system.

It is of course to be understood that if the coil 127 has been energized from the bridge to retain the selector valve in neutral position, when the crew member releases the handle 111 the coil spring 121 will remain compressed by reason of the energization of coil 127 so that the selector valve will remain in neutral position and the door, when once opened, will remain so.

If the crew member on the bridge believes it best to close the door, he may do this by opening switch 135 which deenergizes coil 127. If the crew member passing through the open door should desire to close the same he can do so by opening switches 131' or 131" to deenergize coil 127. Similarly, a crew member at the auxiliary station may close the door by opening the switch (not shown) at such auxiliary station.

In the event the electrical system of the central power unit 11 should fail, as the selector valve 48 is normally in door closing position by reason of springs 116 and 121 the water-tight security will be preserved. If the electrical system should fail while the selector valve is in door opening position, the deenergization of coils 126 and 127 will permit springs 116 and 121 to move the valve member 95 to door closing position and the charged accumulator 32 will force liquid through the system to close the door 49.

If the line to the pressure accumulator 32 should be broken, the auxiliary pressure accumulator 40 which also is in charged condition will provide sufficient liquid to close the door and the one-way valve 37 will ensure that the liquid from the accumulator will flow through the hydraulic cylinder 85.

If the main electrical system is broken, the door 49 can still be opened from the local position by the manual movement of valve member 95 to door opening position. As a result, liquid will flow from pressure accumulator 32 or if the line thereto should be broken, from pressure accumulator 40 to the hydraulic cylinder 85 to open the door.

In the event both the accumulators should be exhausted and the electrical system broken, as the valve member will normally be in door closing position, the crew member may readily close the door 49 if the latter is open, by merely operating pump handles 75 or 67 as the case may be.

If the door is already closed and the crew member desires to open the same, this can readily be accomplished by moving handle 103 to door opening position and operating pump handle 67 which is adjacent the door.

It is apparent that the system above described is of extreme flexibility as the door 49 may be closed from either a local or remote position and may be closed and opened from the local position regardless of the failure of the electrical system or the pressure accumulators.

In the embodiment of the system shown in Fig. 4, the bulkhead door may be controlled from the bridge so that it can be moved to closed and neutral position, but not to open position.

In this embodiment which is identical in many respects to the embodiment shown in Figs. 1 to 3 inclusive, corresponding parts will have the same reference numerals primed.

Referring to Fig. 4 of the drawings, the system desirably comprises a central power unit 11' which includes a liquid reservoir 12' connected by line 13' through valve 14' to a compressor pump 15' driven by a motor 16'. The output of pump 15' is connected through lines 17' and 18' to a safety switch 19' controlling the leads to the motor 16'. The output of the pump 15' is also connected through lines 17' and 27' to a pressure relief valve 28' connected by line 29' to the reservoir 12'. The output of pump 15' is also connected by lines 17' and 31' to pressure accumulator 32' which may be of any suitable type.

The output of central power unit 11' is desirably fed to the system to be operated through a main feed line 33' which has a shutoff valve 36' and a one-way valve 37' in series therewith. Valve 37' is connected to a junction 46' which is connected through line 39' to pressure accumulator 40' which also may be of conventional type and which takes up any surges or shock waves in the line and which provides a secondary supply of fluid in the manner hereinafter to be described.

Junction 46' is connected to a pressure gauge 42' and through a one-way valve 44' and filter 151 to a selector valve 48' desirably located adjacent the bulkhead door to be operated.

Valve 48' which is preferably of the three-position type having a door closing, a door opening and a neutral position, has a plurality of ports leading therein referred to by the numerals 53', 54', 55', 56' and 57', the port 54', which is the liquid inlet port, desirably having the liquid inlet line 47' connected thereto.

The ports 53' and 54' of the selector valve 48', which are the liquid outlet ports, are connected together by line 61' which is connected by liquid return line 62' to the auxiliary reservoir 63', the latter being connected by liquid return line 64' to the main reservoir 12' in the central power unit.

The reservoir 63' is connected through cutoff valve 65', one-way valve 153 and line 154 to a manually operated pump 66', desirably located adjacent the bulkhead door to be operated and having a pump handle 67' for operation thereof, said handle being operable from both sides of the bulkhead door by suitable linkage (not shown). The output of pump 66' is connected through one-way valve 68' and line 47' to the liquid inlet port 54' of the selector valve 48'.

The discharge ports 56' and 57' are desirably connected by lines 81' and 82' respectively to a hydraulic cylinder 85' which has a piston rod 89' connected to the bulkhead door 49' through suitable linkage. Desirably the line 81' is connected to inlet port 83' of cylinder 85' and the line 82' is connected to the port 84' of said cylinder.

The system also includes an auxiliary station having a reservoir 71' connected through cut-off valve 72' and one-way valve 73' to a pump 74' which has an operating handle 75'. The output of the pump is connected through lines 76' and safety valve 150 to the reservoir 71'. Line 76' is also connected to a pressure gauge 79' and through line 77' to the port 155 of a hydraulic cylinder 156, to which a line 157 from cylinder 85' is connected as at 158. Cylinder 156 has a piston 159 in the casing thereof normally spaced from port 155 by coil spring 165 when there is no pressure in line 161 which is connected to line 82', and blocks port 155 when there is pressure in line 161. Cylinder 156 has a line 162 connected thereto at one end and to reservoir 71' at its other end to limit the pressure developed in the auxiliary station.

Piston 159 desirably has a piston rod 163 connected thereto, the free end of which is adapted to coact with a ball valve 166 normally retained on its seat by a spring 167 to close the line 162. This ball valve serves as a safety device to prevent development of excess pressures in line 77' due to the action of the pump 74'. Such excessive pressures would cause the ball 166 to move off its seat so that fluid may escape through line 162 back to reservoir 71'.

To control the valve member 95' of selector valve 48', a pitman or actuating rod 200 is connected thereto at one end and has its other end connected as at 201 to a lever 202 pivotally mounted as at 203 to the frame of the ship adjacent the bulkhead door 49'. Desirably, lever 202 has an identical lever (not shown) affixed thereto but positioned on the other side of the bulkhead door 49' so that such levers may be manually operated from both sides of the door.

A coil spring 204 affixed at one end to the lever 202 and at its other end to the frame of the ship, normally urges the lever downwardly so that pitman 200 can move slide member 95' in corresponding direction.

Affixed to lever 202 is one end of a sleeve 205 which has an internal annular shoulder 171 therein on which is seated a washer 172, the latter being retained on its seat 171 by means of a coil spring 173 compressed between said washer 172 and the plug 174 affixed in the end of the sleeve 205. Extending through end plug 174 and washer 172 is a second actuating rod 206 which has a head 175 affixed thereto beneath washer 172. The free end of rod 206 is connected to a lever 208 pivotally mounted at 209 and normally urged upwardly as shown by means of a coil spring 210, a stop 211 limiting the upward movement of lever 208.

The lever 208 is normally restrained from downward pivotal movement by means of a catch 214 which has a hook conformation 213 at one end to engage the adjacent end 212 of lever 208. The catch 214 is desirably an armature of an electromagnet and is pivoted as at 215, being normally retained in locking engagement with end 212 of lever 208 when the coil 216 of the electromagnet is energized, said coil retaining the armature 214 in locked position against the action of the coil spring 176 which normally tends to urge the armature to unlocked position.

The circuit for the coil 216 of the electromagnet is from one side of the power line 177 through switches 220 and 219 connected in series and positioned respectively on each side of the bulkhead door 49', through coil 216 and lead 218 to a switch 221 positioned on a control panel 24' on the bridge of the ship, said switch being connected to the other side of the power line 178.

When the coil 216 is energized and the lever 208 is engaged by catch 213, spring 204 which is weaker than spring 172 will be stretched and extended and the connecting rod 200 will be raised thereby retaining the slide member 95' of selector valve 48' in neutral position.

When the electromagnet is not energized, the coil 176 connected to armature 214 will pivot the hook end 213 of the latter away from lever 208 so that coil spring 204 will move the lever 202 and connecting rod 200 downwardly thereby positioning slide member 95' of selector valve 48' in door closing position.

Where the coil 216 is energized and lever 208 is engaged by catch 213, thereby retaining the selector valve 48' in neutral position, the latter may readily be placed in door closing position by manually pressing down on lever 202. During this operation, which may be performed by a crew member adjacent the bulkhead door, as lever 208 is restrained by catch 218 the sleeve 205 will ride downwardly on rod 206 thereby compressing spring 173.

With the construction and circuit above described, the bulkhead door can be opened only by the actuation of the lever 202 and not from the bridge. To effect such opening of the door 49' it is merely necessary manually to lift lever 202. Such movement will cause rod 200 to be raised to move the slide member 95' to door opening position. Although the rod 206 is restrained by lever 208, which abuts against stop 211, the sleeve 205 may ride up rod 206, the inner end of which will slide into the sleeve through washer 171.

With the above circuit, it is apparent that there is no chance that a crew member at the auxiliary station would be able to shut the bulkhead door 49' while a crew member adjacent the door at pump 66' might be attempting to open the same in order to pass therethrough. Such safety means is afforded by reason of the fact that upon actuation of the pump 66', fluid will flow through line 82' into cylinder 156 to move piston 159 so that it blocks port 155. Consequently, no fluid will flow through cylinder 156 from pump 74' through line 157 to the door operating cylinder 85'. The fluid in line 76' of the pump 74' by reason of the pressure in such line caused by the closing of port 155 will flow through valve 150 back into reservoir 71'.

When pump 66' is not being operated the piston 159 will not close port 155 so that upon actuation of pump 74' fluid may flow through line 76', ports 155 and 158, line 157 into hydraulic cylinder 85' to move the latter to door closing position.

Means are desirably provided at various locations on the ship to indicate the position of the bulkhead door 49'. To this end door 49' has a trip finger 230 mounted thereon which, when the door is in closed position, will coact with a switch 231 to close the latter. As a result, a circuit will be completed from one side of the power line through bulbs 232, 233 located on the control panel 24' and at the auxiliary station respectively through leads 181, 182 and 183 to fixed contact 184 of switch 231. The fixed contact 185 of said switch is connected through lead 186 to one side of the bell 234, the other side of which is connected to the other side of the power line. Movable contact arm 187 of switch 231 which normally engages fixed contact 185 is connected through lead 188 to switch 235, the other side of said switch being connected to the other side of the power line.

With the above circuit, the bell 234 will be energized through switch 235 which will be closed when the door is in open position, but which will be open when the lever 202 is in neutral position. When the door 49' is in closed position, switch arm 187 will engage fixed contact 184 to complete a circuit to the bulbs 232 and 233 through switch 235 which will also be in closed position when the door 49' is closed.

Desirably, visual means 236 are provided controlled by the movement of piston rod 89' to indicate when the door 49' is opened or closed.

Although in the embodiment illustratively shown in Fig. 4 but a single control for a single bulkhead door 49' is shown controlled by switch 221 on the bridge, it is of course to be understood that a plurality of switches 221 could be provided on control panel 24'. Suitable means are provided controlled by a rotatable lever 237 simultaneously to open all of the switches 221 to deenergize the electromagnet thereby to effect closing of the bulkhead doors in the manner previously described. Thereafter, individual switches 221 may be operated to energize the electromagnets 216.

In the event the central power unit 11' is not functioning, the lever 202 may be moved to door closing position and pump 66' manually actuated to close the door. If desired, the door may also be closed from the auxiliary station by actuating pump 74'.

In the event of failure of the electric system and deenergization of the coil 216 of the electromagnet spring 204 will automatically move the slide member 95' of selector valve 48' to door closing position thereby insuring watertight security. If both the electric system and central power unit 11' should be defective, the door 49' may readily be closed by action of the pump 74'.

The embodiment shown in Figs. 5 and 6 desirably comprises a central power unit 250 having a main feed line 251 to cut-off valve 252 and one-way valve 253 to a junction 254. Connected to such junction 254 through line 255 is a pressure accumulator 256 which may be of any suitable type, and a pressure gauge 257 connected to junction 254 by line 258 indicates the pressure in the system. Junction 254 is connected through one-way valve 259 and lead 261 to the liquid inlet port 262 of selector valve 263, which desirably is of a two-position type having a bulkhead door opening position and a bulkhead door closing position. The selector valve desirably comprises a substantially cylindrical outer casing 264 having in addition to the liquid inlet port 262, ports 265, 266 and 267. The casing 264 has a piston 268 therein to opposite ends of which piston rods 269 and 271 are connected respectively, said piston rods extending through the end walls 272 and 273 of said casing.

The piston 268 is desirably elongated, as shown, having an annular groove 275 therein between its end heads 276 and 277. As shown, the piston 268 has a longitudinal bore 278 therethrough leading through the end heads 276 and 277. The ports 262 and 267 are so positioned in the casing 264 that when the end head 277 of the piston abuts against end wall 273 of the casing, said ports will be in communication with the annular groove 275, while the ports 265 and 266 will be in communication with the interior of the casing between end wall 272 and head 276.

When the head 276 of the piston is adjacent end wall 272, ports 265 and 267 will be in communication with annular groove 275, port 266 will be in communication with the interior of the casing between end head 276 and wall 272 and port 262 will be in communication with the interior of the casing between head 277 and wall 273. The ports 266 and 267 of the selector valve 263 are desirably connected by lines 279 and 281 to the ports 282 and 283 of a hydraulic cylinder 284. This cylinder desirably has a piston 285 therein defining chambers 286 and 287 on each side thereof with which ports 282 and 283 respectively communicate. The piston desirably has a piston rod 288 connected thereto which extends through the end wall 289 of the cylinder and is connected to the sliding bulkhead door (not shown). The port 265 of the selector valve 263 is desirably connected through return line 291 to a reservoir 292 which is connected through cut-off valve 293, pump 294, line 295, one-way valve 296 and line 297 to liquid inlet line 261. Desirably the pump 294 has an operating handle 298 for actuation thereof. Associated with the selector valve 263 is an auxiliary station 299 which desirably has a reservoir 300 connected through cut-off valve 301 and one-way valve 302 to a pump 303, the output of the latter being connected to a pressure gauge 304 and through line 305 and a one-way valve 306 to liquid inlet line 261. In order manually to actuate the selector valve so that it may be moved to door opening position, the piston rod 271 desirably has a control handle 272' pivotally connected thereto as at 273' with a lower end of the control handle 272' being pivotally connected as at 274 to a link 275' pivoted to a lug 276' integral with the casing 264.

Desirably the control lever 272' may be operated from either side of the bulkhead door in the manner shown in Fig. 1 and a spring 307 connected at one end to piston rod 269 and at its other end to the frame of the ship as at 308 normally urges the piston 268 to door closing position, as shown in Fig. 5. In order automatically to actuate the selector valve 263 from the bridge of the ship, a coil 309 is positioned around piston rod 269 which acts as the armature of the electromagnet thus formed. This coil when energized serves to move the piston rod 269 and piston 268 to the position shown in Fig. 6 or door opening position. The circuit for coil 309 is from switch 310 on the bridge of the ship through lead 311 and coil 309. Desirably a switch 311' positioned adjacent the bulkhead door is connected in series with line 311 to interrupt the circuit to the coil 309. In addition, a second switch (not shown) may be provided, positioned at the auxiliary station 299. Desirably an additional switch 312 is also connected in series in line 311 and operated by means of a chain 312' connected to pump handle 298 so that when the pump 294 is operated, the circuit to coil 309 will be broken and the selector valve 263 will automatically be placed in door closing position by the spring 307.

In the operation of the system above described with switch 310 in open position, the bulkhead door will be closed. The path of the fluid is from central power unit 250 through line 251, valves 252 and 253, junction 254, valve 259, lead 261, port 262, longitudinal bore 278, port 266, line 279 to one side of the piston 285 of the cylinder 284. As the result of the flow of fluid into the chamber 286, the piston will be moved to door closing position, the fluid in chamber 287 flowing from port 283, line 281, ports 267 and 265 through return line 291 to reservoir 292. When switches 310 and 312 are closed and coil 309 is energized, the piston 268 will be in door opening position shown in Fig. 6, and fluid will flow through inlet port 262, annular groove 275, port 267, line 281, and port 283 into chamber 287 of the hydraulic cylinder 284, thereby moving the piston 285 thereof to door opening position, the fluid in chamber 286 flowing through port 282, line 279, port 266 of selector valve 263, port 265, and return line 291 to reservoir 292.

Where it is desired locally to control the bulkhead door to close the same even when coil 309 is energized, it is merely necessary to open switch 311' to break the circuit to coil 309 so that selector valve 263 will automatically move to door closing position under the urging of spring 307. Where local control is desired when the central power unit has failed and coil 309 is energized, it is merely necessary to move selector valve 263 to closed position and actuate pump handle 298. As a result switch 312 will be opened to break the circuit to coil 309 to ensure that a crew member on the bridge will have no further control. Actuation of pump 294 will cause fluid to flow from reservoir 292 into liquid inlet line 261. In addition, if desired, the bulkhead door may be closed from the auxiliary station 299 where there is a failure of the main power unit 250 and the electrical system, for in such case the selector valve 263 will be moved to door closing position by the coil spring 307, and the actuation of pump 303 will cause liquid to flow through liquid inlet line 261.

In the embodiment shown in Fig. 7, which is especially designed for use with a small number of doors, the control system desirably comprises a remote control station which may, for example, be located on the bridge of a ship and desirably comprises a fluid reservoir 313 connected by line 313' through cut-off valve 314 and filter 315 to the input 316 of a hand pump 317 which may be of any suitable type. The output 318 of pump 317 is desirably connected by lines 319 and 321 to a pressure gauge 322 and by line 319 to a safety valve 323 which is connected by line 324 to the return line 325 of the system which leads back to the reservoir 313. Pump 317 is connected by main feed lines 319 and 326 to branch feed lines 328 and 329 which lead to the various bulkhead doors (not shown) to be operated.

As the circuits for each of the bulkhead doors are substantially identical, only one will be described in detail, corresponding parts of the other having the same reference numerals primed.

Line 328 is connected to one-way valve 331, the output of which is connected by line 332 to port 333 of selector valve 334, the latter desirably having a substantially cylindrical casing 335 having, in addition to port 333, two other ports 336 and 337. Slidably mounted in the bore 338 of casing 335 is a valve member 341 which desirably is a rod having an annular groove 342 therein. The valve 341 is desirably controlled by a lever 343 pivotally connected thereto as at 344, and pivotally connected at its end as at 345 to a link 346 pivoted to a lug 347 preferably formed integral with the casing.

The valve member is normally retained with ports 333 and 337 in communication with each other through annular groove 342 and with port 336 which is the outlet port, sealed by the valve member, by means of a spring 348 compressed between the lever 343 and a restraining member 349 mounted in any suitable manner, said port 336 being connected to return line 325 by line 330.

The port 337 is connected by line 351 to the port 352 in the casing 353 of hydraulic cylinder 354. The other port 355 of cylinder 351 which is on the other side of the piston 356 therein which defines chambers 356$^a$ and 356$^b$, is connected by line 357 to line 332 as at 359. The hydraulic cylinder 354 has a piston rod 361 connected to piston 356 and which extends through the end wall 362 of the cylinder, the rod 361 being connected for example, to a bulkhead door (not shown) to move the latter.

In order to operate the bulkhead door from a position adjacent the latter, a pump 371 is desirably mounted near the door and the associated selector valve 354. The outlet 372 of the pump 371 is connected by line 373 to line 332 leading into port 333 of the selector valve and the inlet 374 of the pump is connected by line 376 to return line 325.

By reason of the spring 348, the valve member 341 will normally be in the position shown in Fig. 7 in which ports 333 and 337 are in communication through annular groove 342. To close the bulkhead door controlled by the hydraulic cylinder 354, it is merely necessary for an operator on the bridge of the ship to actuate the lever of pump 317.

As a result, fluid such as oil, will be sucked or drawn from reservoir 313 through line 313', open valve 314, filter 315 through pump 317, lines 319 and 326 to branch line 328 which leads into the one-way valve 331. This valve is so designed to permit liquid to flow therethrough in the direction of the arrow and such liquid will flow through line 332 into port 333 of selector valve 334, through annular groove 342 in valve member 341 and through port 337 and line 351 into the port 352 of the hydraulic cylinder 354 in communication with chamber 356$^a$. As a result, pressure will be exerted against the piston 356 to force the piston rod 361 outwardly through the end wall 362 of the cylinder to close the door. The movement of the piston will also force the oil in the chamber 356$^b$ of the hydraulic cylinder outwardly through port 355 and line 357 back to line 332.

Although both of the chambers 356$^a$ and 356$^b$ of the hydraulic cylinder 356 are in communication with the inlet line 332, as the surface area of the piston 356 in chamber 356$^a$ is greater than that of the piston in chamber 356$^b$ by reason of the piston rod 361 therein, greater pressure will be exerted against the face of the piston in chamber 356$^a$ than against the face of the piston in chamber 356$^b$ and consequently the piston rod 361 will move to door closing position.

Once the piston rod 361 has moved to the limit of its stroke, no more fluid can be forced into the hydraulic cylinder 354 by the pump 317 at the remote control station. Consequently, the pressure gauge 322 associated with pump 317 will show an increase of pressure as the pumping continues which will indicate that the piston rod has moved to the limit of its stroke and the operator can stop pumping. In the event the operator should continue pumping, the safety valve 323 would open and the fluid from the pump would flow through the valve 323 and line 324 back to return line 325 so that with continued pumping no damage could occur as the fluid would merely flow in the closed circuit through the pump.

If a crew member should desire to open the bulkhead door in order to pass therethrough, he need merely pull on lever 343 of selector valve 334 against the tension of coil spring 348 so as to move the slidable valve member 341 to the left from the position shown in Fig. 7. As a result, port 333 will be sealed by the valve member 341 and ports 336 and 337 will be in communication through annular groove 342. The crew member then need merely actuate the lever of pump 371 adjacent the door to draw fluid from reservoir 313 into the inlet 374 of the pump 371 and thence from the outlet 372 of the pump 371 through lines 373, 332 and 357 into the port 355 of the hydraulic cylinder which leads into the chamber 356$^b$. By reason of the check valve 331, no fluid will be forced by the pump 371 through the remaining portions of the system.

The pressure of the fluid forced into the chamber 356$^b$ of the hydraulic cylinder 354 will move the piston 356 thereof to the left from the position shown in Fig. 7, forcing the fluid in chamber 356$^a$ through port 352, line 351, port 337, annular groove 342, port 336 and line 330 to the return line 325, thereby moving the piston rod 361 and the door connected thereto to open position.

As the operator at the local position will see when the bulkhead door is open, there is no chance that he will continue pumping after this occurs and consequently no excess pressure will be built up. It could if desired be possible to provide a safety valve (not shown) between pump 71 and selector valve 34 with a return to reservoir 313.

As the operator at the local position has moved the selector valve to door opening position, if the operator at the remote station should attempt to close the door by operating pump 317, this would only cause an additional flow of fluid into the chamber 356$^b$ of the hydraulic cylinder which would aid in the opening movement of the door.

After the door is opened and the control lever 343 for the selector valve is released, the valve member 341 will automatically be restored to door closing position by the coil spring 348. The door may then be closed by the operator at the remote station by merely actuating pump 317 in the manner previously described. If the operator in the neighborhood of the door believes that the closing thereof from the remote station is occurring at too slow a rate, he may aid in such closing by merely operating the local pump 371.

In the embodiment shown in Fig. 8, parts corresponding to those in Fig. 8 have the same reference numerals with the added letter "a." In this embodiment, means are provided so that the selector valve 334ª and the pump 371ª may be controlled with but one hand. For this purpose the operating lever 381 of the pump is provided with a control element, illustratively a pivoted grip 382 connected by a flexible cable 383 to the valve member 341ª of the selector valve 334ª. The flexible cable 383 which is controlled by the grip 382 is normally under such stress so as to force the valve member to door closing position and this is desirably accomplished by means of spring 384 interposed between lever 381 and grip 382.

It is of course to be understood that where the operator of the embodiment shown in Fig. 8 desires to aid in the closing of the door, he need merely grip the lever 381 without pressing the grip portion 382 and actuate such lever to operate the pump 371ª in the manner heretofore described.

In the embodiment shown in Fig. 9, contrary to the embodiments heretofore described, the remote station predominates in the control of the bulkhead door rather than the local station.

In this embodiment, the central control unit 400 has a reservoir 401 connected through valve 402 and filter 403 to a pump 404 having an operating handle 405. The output of pump 404 has a pressure gauge 407 therein and flows through a main feed line 406 to the systems to be operated, one of which is illustratively shown. Desirably, a pressure accumulator 500 of conventional type is connected to line 406 to maintain the pressure in such line even when pump 404 is not actuated. Feed line 406 is connected through valves 502 and 503 to line 409 which leads into the port 413 of hydraulic cylinder 410.

As shown, cylinder 410 has a piston 411 slidably mounted therein with a piston rod 412 affixed thereto and extending through the end wall 412' of the cylinder, the piston rod actuating a bulkhead door (not shown), upon movement of the piston 411 in the direction of the arrow. The cylinder 410 has a partition 415 therein spaced from the end wall 416' of the cylinder, said partition having an opening 415' therethrough, said port 413 leading into the chamber 417 defined by said partition 415. A plunger 414 positioned in chamber 417 adjacent port 413 is designed to block flow of fluid through port 416. Port 416 in the cylinder also in communication with chamber 417 is connected to selector valve 418, the latter being substantially identical to the one shown in Figs. 5 and 6 and being movable from door opening to door closing position. The selector valve has a line 419 connected thereto which is in communication with the port 420 in the cylinder 410. Desirably, line 419 is connected through safety pressure valve 440 and line 441 to reservoir 431.

Desirably, the selector valve is normally retained in door closing position by a coil spring 421 which draws the slide member 422 of the selector valve to the left as shown. The slide member 422 may be moved to door opening position by means of lever 424 connected thereto. The selector valve 418 has an outlet port 426 to which the return line 425 is connected, said return line leading through lines 428 and 408 into the reservoir 401 as well as through line 430 into reservoir 431. The reservoir 431 supplies fluid through line 432 to a pump 433 desirably located adjacent the door to be operated, said pump being controlled by a handle 434 and having its outlet connected through line 435 to selector valve 418.

In the operation of the system shown in Fig. 9, with the selector valve 418 in door closing position, as shown, by reason of the tensed coil spring 421, the door (not shown) may be closed from the local position by actuating pump 433. As a result, liquid will flow through line 435, selector valve 418, line 417' into chamber 417 and through opening 415' to move the piston 411 to door closing position. The liquid on the other side of the piston 411 will flow through line 419, selector valve 418, lines 425 and 430 into reservoir 431.

With the system above described all of the bulkhead doors may be simultaneously closed from the central power unit by the actuation of pump 404. This will cause fluid to flow from reservoir 401 through line 406, valves 502 and 503, line 409 into port 413 of the hydraulic cylinder. As a result, the plunger 414 will be lifted to close opening 416 so that fluid from line 409 may fill chamber 417 and flow through opening 415' to move the piston 411 to door closing position.

In the event that the selector valve 418 should be moved to door opening position and the pumps 404 and 403 should simultaneously be actuated, as the pump 404 is stronger than the pump 433, the plunger 414 will be moved in chamber 417 to seal port 416 and the fluid flowing through port 413 and opening 415' will move piston 411 to the right, i. e., to door closing position against the counteraction of the fluid flowing from pump 418 through line 419 into pump 420. Desirably the safety valve 440 connected in the line 441 between line 419 and reservoir 431 is set so that upon development of excess pressure in line 419 due to the reaction of the pump 404 and 433, fluid in line 414 will flow through valve 440 and line 441 into reservoir 431. Consequently, with the system above described, the central power unit will control the closing of the doors regardless of the action of the pumps at the local stations.

It is of course to be understood that if desired, pumps of well known type could be used which have two outputs, i. e., an output giving a relatively large displacement with low pressure to be used for the major portion of the closing and opening movement of the door and particularly for that part of the movement during which the door moves freely on its track and a second output giving a small displacement with high pressure which is utilized to jam the door at the end of the closing operation to effect a tight seal and to unjam the door at the beginning of the opening operation when great pressure would be required.

It is of course to be understood that although axial type pumps have been shown, pumps of other type such as reciprocating or rotating pumps may be used.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A system for operating safety doors, comprising a remote central control station, a power accumulator at each door for storing energy for emergency operation, a motor associated with each door for actuation thereof, a selector valve at each door controlling said motor and adapted to connect said power accumulator to said motor to move the door between open and closed position, resilient means normally urging said selector valve to door closing position, a second motor adapted when actuated to overcome said resilient means to retain the selector valve in door open position and means at said remote central control station controlling said second motor whereby upon de-actuation thereof said resilient means will move the selector valve to door closing position, said selector valve being adapted to be locally controlled to overcome the force of said resilient means to move the valve to door open position.

2. The combination set forth in claim 1 in which a remote power station is provided and means under control of each of said selector valves to connect said remote power station to said associated first motor to move the associated door between open and closed position.

3. The combination set forth in claim 1 in which said first motor comprises a hydraulic unit having a casing with a piston slidable therein and a port on each side of said piston, said selector valve comprises a casing having a first and second pressure port and a first and second control port, said valve casing having a piston slidable therein, said piston having an annular peripheral groove and a bore therethrough, means connecting said control ports to the ports of said motor, said selector valve when in door closed position providing communication from said first pressure port through said bore to said first control port and in door open position providing communication between said first pressure port and said second control port through said annular groove.

4. A system for operating safety doors comprising a remote electric central control station, a pressure fluid accumulator at each door for storing energy for emergency operation, a motor associated with each door for actuation thereof, a selector valve at each door controlling said motor and adapted to connect said pressure accumulator to said motor to move the door between open and closed position, a check valve permitting flow in direction only from said pressure accumulator to said motor, resilient means normally urging said selector valve to door closing position, a solenoid controlling said valve, and adapted when actuated to overcome said resilient means to retain the selector valve in door open position, a switch at said remote electric control station controlling said solenoid, whereby when said switch is actuated to break the circuit to said solenoid to de-energize the latter said resilient means will move the selector valve to door closing position, said selector valve being adapted to be locally operated at each door to overcome the force of said resilient means to move the valve to door opening position.

5. A system for operating movable elements such as safety doors on ships, said system comprising a hydraulic fluid pressure station having a fluid reservoir and a pump, a double acting jack operatively connected to each door for actuation thereof, said jack having a casing with a piston therein and a pair of ports leading into the casing on each side respectively of said piston, a selector valve connected to said fluid pressure station, said valve having a pair of control ports connected respectively to said casing ports, said valve having a door open and door close position, resilient means normally retaining said selector valve in door closed position, means manually to actuate said selector valve, and a pressure accumulator associated with each door and connected to said selector valve.

6. The combination set forth in claim 5 in which means are provided associated with said selector valve which when actuated overcomes the force of said resilient means, and means remote from the door to de-actuate said means.

7. The combination set forth in claim 5 in which an auxiliary control station is provided, comprising a pump having an outlet, a reservoir supplying said pump, a cylindrical casing having a piston therein, a line connecting the outlet of said pump to said casing, a line connecting said casing to the inlet port of said cylinder associated with the door closing position thereof, resilient means normally retaining said piston in position to afford communication between the outlet of said pump and the inlet port of said cylinder, said casing having a port therein associated with the end of said piston, a line connecting the port of said cylinder associated with the door opening position thereof to said port whereby said piston will be moved to seal the port in said casing connected to the outlet of said pump upon movement of the door to closed position.

8. The combination set forth in claim 5 in which an auxiliary control station is provided comprising a pump having an outlet, a reservoir supplying said pump, a cylindrical casing having a valve seat in said casing, a ball valve, resilient means normally retaining said ball valve on said seat, a line connecting the end of said casing having the valve therein to said reservoir, a piston in said casing, a piston rod affixed to said piston, and adapted to coact with said ball valve to move the latter off its seat, a line connecting the outlet of said pump to said casing, a line connecting said casing to the inlet port of said cylinder associated with the door closing position thereof, resilient means normally retaining said piston in position to afford communication between the outlet of said pump and the inlet port of said cylinder, said casing having a port therein associated with the end of said piston, a line connecting the port of said cylinder associated with the door opening position thereof to said port, whereby said piston will be moved to seal the port in said casing connected to the outlet of said pump upon movement of the door to closed position and said piston rod will move the ball valve off its seat.

9. The combination set forth in claim 5 in which an indicating lamp is provided at said central power unit and an alarm bell is provided adjacent said door, and switch means are provided to energize said bell when said door is opened and to energize said lamp when the door is closed.

10. The combination set forth in claim 5 in which said selector valve has a movable member controlling said ports, said movable member has an actuating rod affixed at one end thereto, a lever pivotally mounted near one end is affixed to the other end of said actuating rod, the resilient means normally urges said lever to move said actuating rod, a sleeve affixed at one end to said lever, a connecting rod slidably mounted in said sleeve, resilient means coacting with said connecting rod to urge the latter into said sleeve, a lever pivoted at one end to which the outer end of said connecting rod is mounted, displaceable means releasably coacting with said lever to prevent pivotal movement thereof by said aforementioned springs, and an electromagnet controlling said displaceable means.

11. A door operating system comprising a source of fluid under pressure, a selector valve having at least three ports, slidable means in said valve controlling said ports, means normally retaining said means in position to provide communication between two of said ports and to block off the remaining port and moveable to provide communication between one of said two ports and said normally blocked off port and to block off the other of said two ports, a main fluid feed line from said source of fluid under pressure to one of said communicating ports, a hydraulic cylinder having a piston therein defining a pair of chambers each having a port, fluid lines connecting said ports between two of the ports of said selector valve, a pump having an inlet and an outlet, a reservoir connected to the inlet of said pump, a fluid line connecting the outlet of said pump to one of said ports of said selector valve, electrical means associated with said slidable valve means to move the latter and means controlled by said pump automatically to break the circuit to said electrical means upon actuation of said pump.

12. A system for operating movable members, comprising a remote central control station, a power accumulator at each member for storing energy for local operation, a motor associated with each member for actuation thereof, a selector valve at each member controlling said motor and adapted to connect said power accumulator to said motor to move the member between a safety position and another position, resilient means normally urging said selector valve to said safety position, a second motor adapted when actuated to overcome said resilient means, and means at said remote central control station controlling said second motor whereby upon de-actuation thereof said resilient means will move the selector valve to said safety position, said selector valve being adapted to be locally controlled to overcome the force of said resilient means to move the selector valve to said other position.

References Cited in the file of this patent

UNITED STATES PATENTS

| | | |
|---|---|---|
| 716,783 | Sullivan | Dec. 23, 1902 |
| 875,021 | Westbrook | Dec. 31, 1907 |
| 926,111 | Gleason | June 29, 1909 |
| 990,877 | Hulme | May 2, 1911 |
| 1,828,643 | Cannon | Oct. 20, 1931 |